April 19, 1966 G. R. KREGNESS ETAL 3,247,490

COMPUTER MEMORY SYSTEM

Filed Dec. 19, 1961

3 Sheets-Sheet 1

INVENTORS
GLEN R. KREGNESS
CHARLES J. PENCE
BY Thomas J. Nikolai
AGENT

INVENTORS
GLEN R. KREGNESS
CHARLES J. PENCE
BY Thomas J. Nikolai
AGENT

COMPUTER MEMORY SYSTEM

Filed Dec. 19, 1961 3 Sheets-Sheet 3

INVENTORS
GLEN R. KREGNESS
CHARLES J. PENCE
BY Thomas J. Nikolai
AGENT

United States Patent Office
3,247,490
Patented Apr. 19, 1966

3,247,490

COMPUTER MEMORY SYSTEM

Glen R. Kregness, Hopkins, and Charles J. Pence, Minneapolis, Minn., assignors to Sperry Rand Corporation, New York, N.Y., a corporation of Delaware Filed Dec. 19, 1961, Ser. No. 160,589
10 Claims. (Cl. 340—172.5)

This invention relates generally to memory apparatus suitable for use in digital data processing equipment, and more specifically to a non-volatile memory for storing a predetermined program and its cooperation with the main or volatile memory of the computer.

Computers have been designed and developed which can store a vast quantity of information and perform computations at super-human speeds. Still, one problem has continued to exist; namely, the making of the initial entry into the computer so that subsequently, larger volumes of information may be loaded therein. In early prior art computing systems, the data was initially placed into the memory by means of a rather time consuming manual loading operation. Next, semi-automatic means were developed for implementing the initial entry of data from peripheral devices.

In the recent past, it has become a necessity for many applications in which a computer is used, that the computer be loaded (or reloaded in the event of a fault) with information in a minimum amount of time. One need only look to the manner in which data processors are employed in real-time systems for a justification of the foregoing statement. Computer applications, which require continuous and generally unattended operation of the computer, as do real-time applications, demand a rapid and automatic program routine for the restoration of information into the memory upon the occurrence of certain malfunctions.

The present invention is concerned with a solution to this problem. A semi-permanent or non-volatile memory of limited capacity is provided in conjunction with the main memory, and this non-volatile memory stores a so-called "bootstrap routine." The term "bootstrap routine" as used herein may be defined as a series of computer instructions which, when executed, activate an external data handling device connected to an input channel of the computer to effect a transfer of the desired working programs into the main memory. The invention also is concerned with a suitable control network which is tied in with the normal addressing structure and timing sequence of a conventional coincident current magnetic core memory to produce "synthetic" memory words in the Memory Communications Register to permit computer operation independent of the contents of the main memory. This control network may be initiated either manually, in the case of an initial loading operation, or automatically in the event a computer fault takes place.

It is accordingly an object of the present invention to provide novel apparatus for implementing the loading of the memory section of a digital computer.

Another object of this invention is to provide apparatus for effecting the reloading of information into the main memory of a computer upon the occurrence of a fault which might have caused the data originally stored in the memory to be totally or partially destroyed.

Still another object of the present invention is to provide a preset auxiliary memory for the storage of a predetermined program of instructions which employs the same selection circuits normally used with static magnetic memories for reading out the program.

Other objects of the invention will be pointed out in the following description and claims and illustrated in the accompanying drawings, which disclose, by way of example, the principle of the invention and the best mode, which has been contemplated, of applying that principle.

Figure 1:
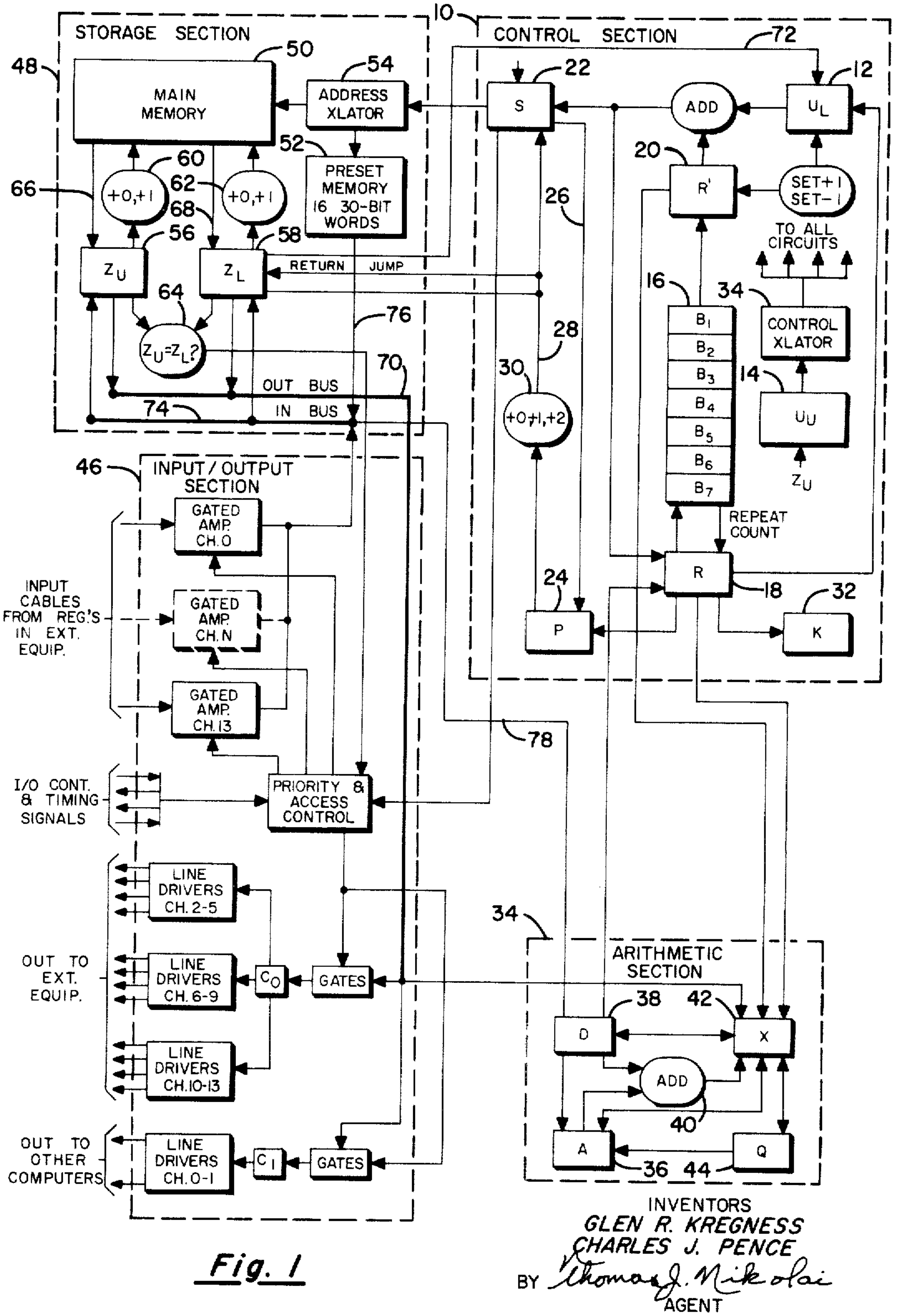
FIG. 1 illustrates in block diagram form a computer incorporating the present invention.

Referring now to FIG. 1, the computer incorporating the preferred embodiment of this invention is shown as being comprised of four main sections. The first to be considered is the Control Section, which is shown as being enclosed by the dash line 10. Contained within this section are those registers and circuits required to procure, modify, and execute instructions of the computer program. While the present invention can be incorporated into any conventional internally stored program computer, for the purpose of illustration, reference will be made to the various elements commonly found in digital data processors in order to supply a background for the terminology used herein. The Program Control Register, sometimes referred to as the instruction register or U-register, holds the current instruction word during its execution. In the computer under consideration, the basic words size is preferably 30-bits, but in some instances it is desirable to treat the 30-bit word as two half words, each 15 bits in length. For this reason the U-register is illustrated diagrammatically in FIG. 1 as being divided into two sections, 12 and 14. The lower half 12 labeled $U_L$ generally holds the address or operand portion of the 30-bit instruction word and the contents of this half may be modified as desired during its execution, as will be subsequently explained.

The upper half 14 of the U-register labeled $U_U$ generally holds the function code as well as various designators for controlling the manner in which the instruction will be executed.

To more clearly illustrate the foregoing, there is shown below the format of the 30-bit instruction word used in the computer under consideration, illustrating the bit assignments for the various designators *f*, *j*, *k*, *b*, and *y*.

| *f* | *j* | *k* | *b* | *y* |
|---|---|---|---|---|
| 29 28 27 26 25 24 | 23 22 21 | 20 19 18 | 17 16 15 | 14 thru 0 |

The function code designator, *f*, falls in bit positions 29 through 24 of the U-register and designates the operation to be performed by the instruction. The computer described herein is capable of executing 62 basic instructions. The other two code combinations, which may be formed from the 6 binary digits making up the designator, are fault conditions which, if executed, will cause a fault signal to be generated resulting in a jump to a predetermined address. This feature will be described in more detail later on in the specification.

The *j*-designator referred as the "branch condition designator" interprets for an unconditional skip, a conditional skip or no skip satisfaction for the next sequential instruction of the routine being executed. For example, an instruction word with a *j* value of "0" indicates that no skip is to be made, and that the next instruction is to be taken in its normal sequence. If the *j*-designator is equal to "1"

the next instruction will be unconditionally skipped. If the value of $j$ lies between 2 and 7, a conditional skip is performed. As an example, if the function code translator 34 detects a $j$ value of 3, the next instruction in the sequence will be skipped, provided the condition is satisfied that the contents of the Q-register in the arithmetic section of the computer contains a negative quantity.

The $k$-designator, termed the "operand interpretation designator," specifies the manner in which the operand will be treated. For all practical purposes there are three basic classes of instructions which can be performed by the computer. These classes are Read instructions, Store instructions, and Replace instructions. Those instructions which read an operand, but do not replace it in the memory after the arithmetic operation is performed, are designated Read instructions. Those instructions which do not read an operand, but store one, are designated Store instructions. Instructions which both read and store operand are classified as Replace instructions. The $k$-designator interprets differently for each of these classes. For example, during the execution of a Read instruction, the value of $k$ is used to determine where the operand for the specified operation is to come from, i.e. from memory or some other operational register in the computer. For the Store class, however, the $k$-designator indicates where existing data is to be placed. This could either be a memory location or one of the operational registers. During the execution of a Replace instruction, $k$ signifies not only where the operand is to come from, but also where the result of this operation is to be stored.

The computer incorporating the present invention is a self-modifying, one-address computer. Although this means that one reference or address is provided for the execution of an instruction, this reference can be modified automatically during a program sequence. The references are modified by using the B (index) registers, 1 through 7, which are identified generally by the numeral 16 in FIG. 1. More specifically, to modify the address, the content of a selected one of the 7 B-registers is added to the operand designator $y$ contained in the lower half of the U-register. These index registers are generally used for indexing loops in a program. In addition, the $B_7$ register serves as a counter employed during the execution of a repeat instruction. The $b$-designator falling in bit positions 17 through 15 of the U-register or an instruction, specifies which of the B-registers, if any, will be used to modify the operand $y$.

The R-register 18 and R'-register 20 are employed during the execution of jump instructions and repeat instructions. For example, during the execution of a jump instruction, the contents of a predetermined one of a B-register as determined by the $j$-designator is transmitted to the R' register and the lower half of the U-register is set to contain minus 1. The contents of $U_L$ and R' are then added and transmitted to the R-register 18. Under the control of the timing circuits (not shown), the sum contained in the R-register is then put back into the particular B-register in question so that it now contains a count one less than it originally had. This cycle is repeated until the contents of this particular B-register is equal to zero which indicates a termination of the jump condition.

When a repeat mode of operation is selected, it becomes necessary to control the number of times an operation is repeated. To accomplish this, a count, indicating the number of times the instruction is to be repeated, is inserted into the $B_7$ register and during the execution of the instruction the contents of $B_7$ are decremented. When the count becomes equal to 1, a command is generated to terminate the repeat mode.

The Storage Address Register or S-register 22 holds the 15-bit address of the instruction that is currently being executed. In other words, the data which is to be stored in the memory or the instruction words or operands called for from memory must rely on the S-register for address locations. Since the Storage Address Register is intimately involved with the present invention, its operation will be described in greater detail later on in the specification.

The Program Address Register or P-register 24 is a 15-bit register used to indicate the next sequential address of the program. During the normal sequential execution of instructions, the address of the current instruction is transmitted by way of bus 26 to the P-register. During the next cycle of operation this address is returned to the S-register by way of bus 28 and is incremented by 1. This incrementing is indicated in FIG. 1 by the modifier box 30.

The K-register 32 serves to hold the shift count during the execution of a shift instruction and also counts the number of executed shifts taking place during a multiply or divide operation.

The upper half of the U-register 14 is connected to the control translator 34 which translates the function code and various execution modifiers to generate the command enables for allowing the machine to perform the operation called for by the current instruction word.

Since the present invention is concerned primarily with the Memory Section of the computer, it is felt to be unnecessary to go into greater detail in explaining the operation of the various circuits in the Control Section.

The Arithmetic Section of the computer is shown in FIG. 1 as being enclosed by the dash line 34. Contained within this section is that part of the computer which performs numeric and logical calculations. The important components of the arithmetic section are the A, D, Q, and X registers and the ADD network. The A-register 36 may be thought of as a conventional accumulator commonly found in digital computers. For example, if the instruction being executed calls for an addition operation, the augend is initially contained in the A-register and the addend is initially placed in the D-register 38. As the addition is performed, the sum is formed in parallel by the ADD network 40 and stored in the X-register 42. From the X-register, the sum is then transmitted to the A-register or accumulator. The Q-register 44 is used primarily during multiply and divide operations. Provision is made so that the contents of the A-register and Q-register may be shifted either to the left or to the right individually, or as one double length word during such operations.

The Input-Output Section of the computer is shown in FIG. 1 as being enclosed by dash line 46. For the manner in which this section of the computer operates, reference is made to the copending Burkholder et al. application, Serial No. 156,375, filed December 1, 1961, since the operation is fully described in the above referenced application, it is deemed to be unnecessary to go into greater detail in describing it further herein.

The Storage Section of the computer is shown as being enclosed by dash line 48. Contained within this section is the Main Memory 50, the Auxiliary or Preset Memory 52 and associated address, transfer, and control circuits. In the preferred embodiment of this invention the computer's Main Memory 50 is constructed of modular arrays of ferrite cores which make up a plurality of words, each 30-bits in length. As such, the memory is coincident current driven in a conventional manner and is addressed by means of the Address Translator 54 which operates upon the information contained in the Storage Address Register 22 in the Control Section to produce the required selection signals.

The content of the referenced address is head out in a parallel fashion into the Memory Communications Regisster, termed herein the Z-register. Because of the optional use of 15-bit half words, the Z-register is split into two 15-bit sections 56 and 58 labeled $Z_U$ and $Z_L$, respectively. During the restore portion of the memory cycle, the contents of this Z-register may be incremented by "1" as is indicated by the modifier boxes 60 and 62. This provision allows for automatically increasing the Buffer Control Words, with the result that addresses reference during a block transfer for data are automatically advanced. This operation is also completely described in the aforementioned Burkholder et al. application.

The Comparator 64 is used to detect coincidence between the upper and lower halves of the Buffer Control Word. When coincidence is detected, a signal is generated to terminate the input or output transfer. It should be noted that all communications between either the Main Memory 50 and the Preset Memory 52 and the other sections of the computer employs the Memory Communications Register as a portal. More specifically, as can be seen in FIG. 1, the Z-register receives data signals from the Main Memory by way of the cables 66 and 68. Each of these cables has 15 lines therein to allow a parallel read out of a 30-bit word from a selected memory register. Once data is in the Z-register, it is available to the Input-Output Section by way of the output bus 70. The data in the lower half of the Z-register is capable of being transmitted over the cable 72 to the lower half of the Instruction Register 12. A separate cable (not shown) connects the upper half of the Z-register to the upper half of the Instruction Register. Data representing signals from the Input-Output Section enter the Z-register by way of input bus 74. Similarly, instruction words from the Preset Memory 52 also come by way of the cable 76 and the input bus 74 to the upper and lower half of the Z-register. Finally, data signals from the Arithmetic Section of the computer pass by way of the D-register 38, the cable 78, and the input bus 74 to the Z-register.

FIGURE 2 CIRCUIT

Figure 2:
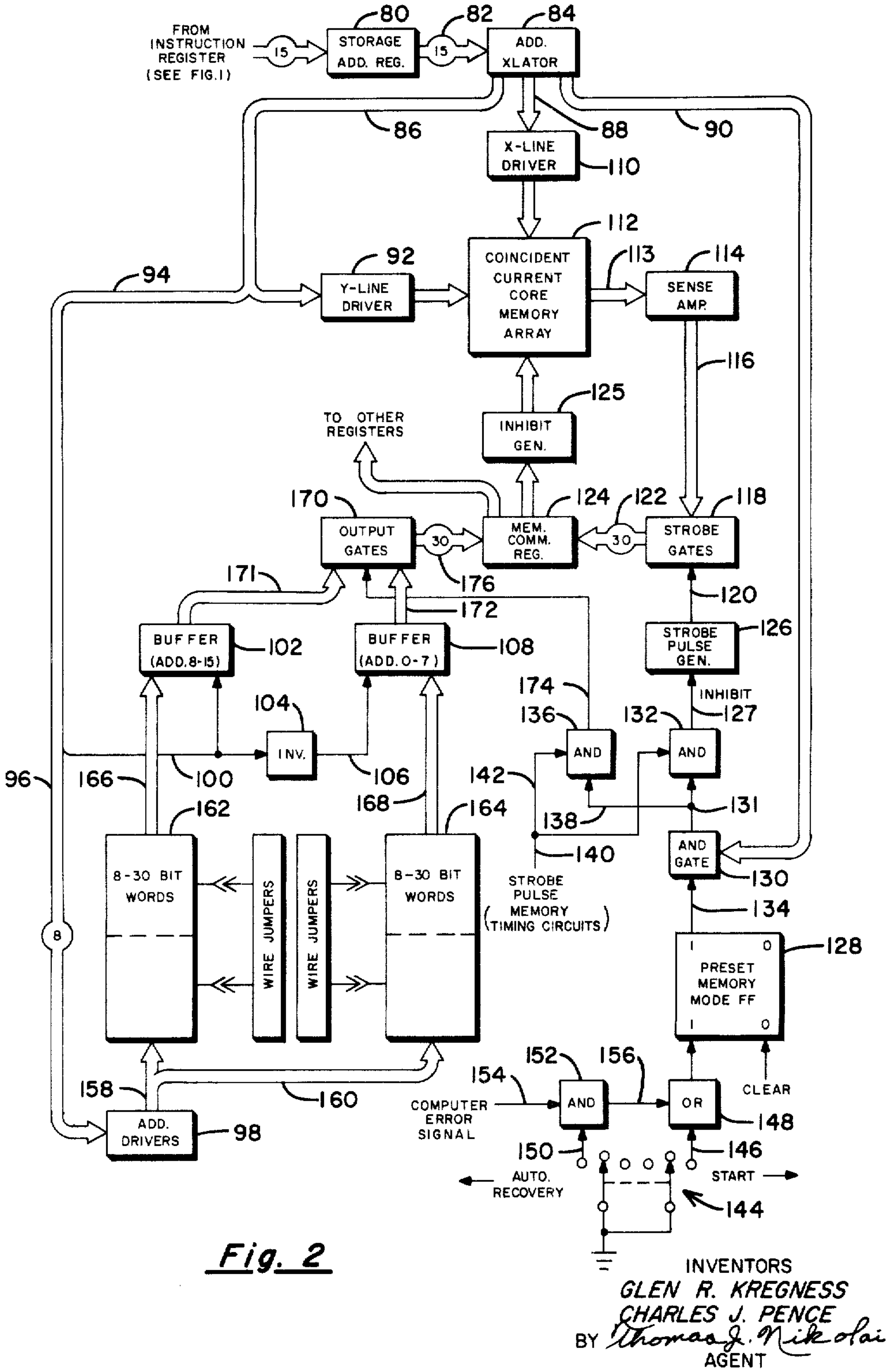
FIG. 2 illustrates schematically the details of the preferred embodiment of the present invention; and, FIG. 3 shows one form of plugboard arrangement which may be employed as the preset memory.

Referring now to FIG. 2, there is shown in block diagram a preferred embodiment of the present invention. Since the various circuits employed herein are well-known in the art, it is felt to be unnecessary to explain each of them in detail. The invention resides in the novel manner in which these conventional circuits are combined, all as defined in the appended claims.

In this figure there is shown a Storage Address Register 80 which receives its input from the Instruction Register, as shown in FIG. 1. Since the computer in question employs a 30-bit instruction word, 15-bits being address representing signals, the Storage Address Register 80 is also preferably 15-bits in length. However, it should be understood that there is no intention of limiting the invention only to computers employing 30-bit words for it is possible to adapt the Preset Memory to computers having different size instruction words without departing from the scope of this invention.

The output of the Storage Address Register is applied by way of cable 82 to an Address Translator 84. This translator operates in a well-known manner to produce signals on its output lines 86, 88 and 90 in accordance with the particular binary code combination contained in the Storage Address Register 80. The lines contained in cable 86 connect first of all to a set of so-called Y-line drivers 92; and secondly, by way of cable branches 94 and 96, to a second set of current drivers 98. One line 100 contained in cable 86 and cable branch 94 is adapted to convey a signal to the input of a set of Buffer Gates 102 and to the input terminal of an inverter 104. The output line 106 from inverter 104 connects to a second set of Buffer Gates 108 similar to the gates 102.

The lines in cable 88 connect to a set of X-line current drivers 110 which are similar to the previous mentioned Y-line drivers. The output signals coming from the X and Y line drivers are applied to the coincident core memory array indicated by the numeral 112. The memory is conventional in that it has a plurality of sense lines strung therethrough for picking up signals generated during a read-out operation when the X and Y line drivers are simultaneously energized to select a particular memory register. These signals are amplified by a Sense Amplifier 114 and the resulting signals are applied via cable 116 to a set Strobe Gates 118. Provided that these gates are enabled by a signal appearing on conductor 120, the information read-out from the memory will pass therethrough and by way of cable 122 to Memory Communications Register or Z-register 124. As has already been mentioned, once the information read-out from the memory is in the Memory Communications Register, it is available to the other registers contained in the computer at various times determined by the control timing circuits (not shown).

The enabling signal for Strobe Gates 118 comes from a Strobe Pulse Generator 126 which, in turn, is controlled by a control circuit comprising the Preset Mode flip-flop 128 and a pair of AND gates 130 and 132. The AND gate 130 receives its input signals from the Address Translator 84 by way of cable 90, and from the Preset Memory Mode flip-flop 128 by way of conductor 134. The output of gate 130 is applied to a first input terminal of AND circuit 132 and also to another AND circuit 136 by way of conductor 138. The other input to gate 132 comes from the memory timing chain, (not shown) during the cycle which is proper for the application of the strobe pulse. This pulse appears on conductor 140 connected to the second input terminal AND gate 132. Likewise, this same strobe pulse is applied by way of conductor 142 to a second input terminal of AND circuit 136.

The Preset Memory Mode flip-flop 128 may be set in either of two ways. When the manually operated switch means 144 is in the START position, the signal for setting the flip-flop is applied by way of conductor 146 and OR circuit 148. Alternately, when the switch 144 is in its AUTOMATIC RECOVERY position an enabling signal is applied by way of conductor 150 to a first input terminal of AND circuit 152. A second input to AND circuit 152 comes from a Program Fault circuit by way of a conductor 154 so that if switch 144 is in the AUTOMATIC RECOVERY position at the time a fault is detected, a signal will appear on conductor 156 which will pass through OR circuit 148 to set the Preset Memory Mode flip-flop.

Figure 3:
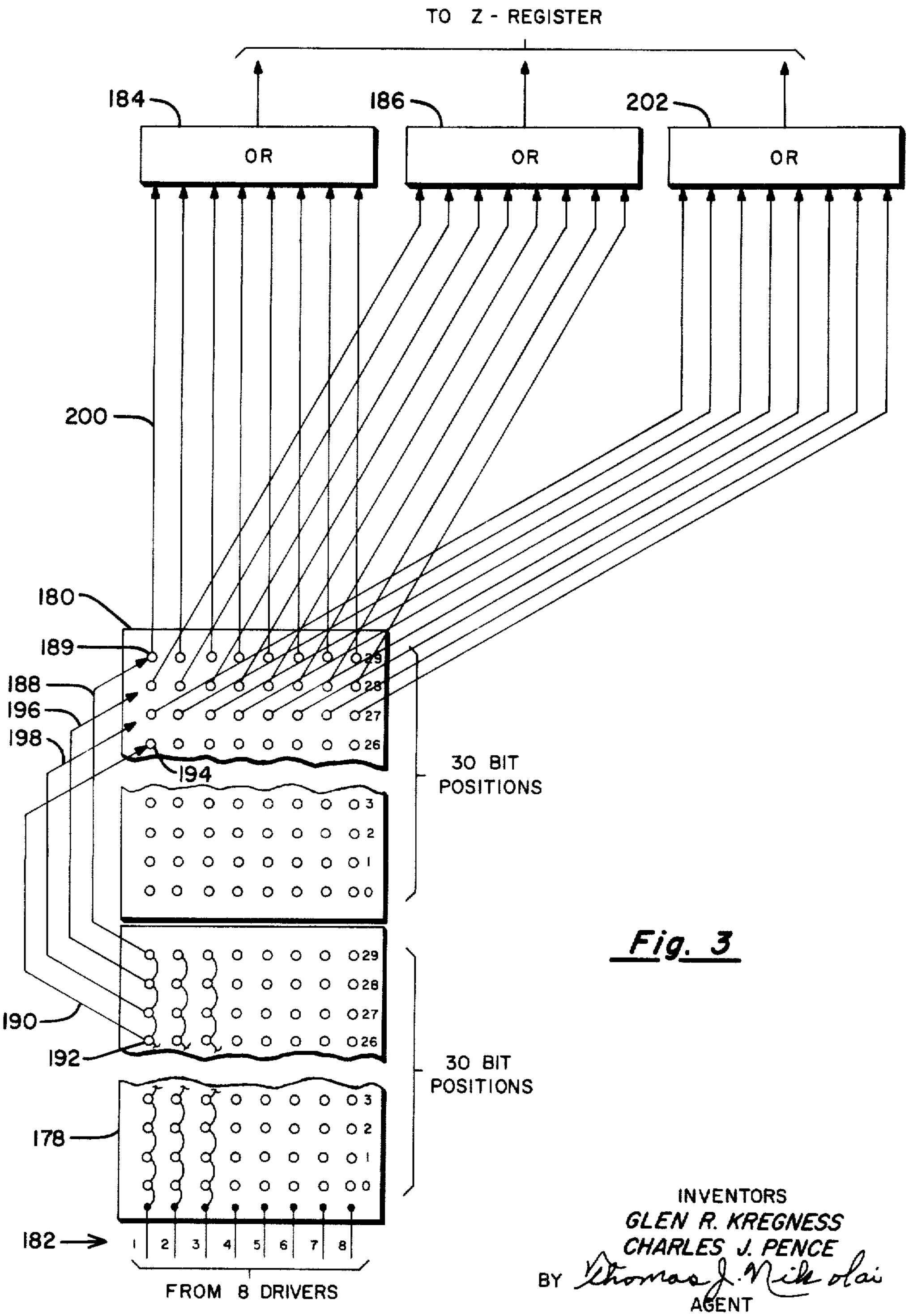

The Current Drivers 98 are connected by means of cables 158 and 160 to the Preset Memory sections 162 and 164, respectively. As will be more fully described when the details of FIG. 3 are set forth, in the preferred embodiment of this invention the Preset Memory is a semi-permanently wired plugboard. The signals appearing at the output of the plugboard section 162 upon the application of current pulses thereto from the drivers 98, pass by way of cable 166 to the set of Buffer Gates 102. Similarly, the signals appearing at the output of plugboard section 164 when driver signals are applied thereto, pass through cable 168 to the set of Buffer Gates 108. Further gating means 170 receive inputs from gates 102 and 108 by way of cables 171 and 172. The enabling pulse for gating means 170 comes from the output of AND gate 136 by way of conductor 174. The gating means 170 controls the transmission of instruction words from the plugboard sections along the cable 176, which is also connected to the stages of the Memory Communications Register 124.

OPERATION

Now that the circuit layout has been described in detail, the operation of the Present Memory circuit of this invention will be considered.

In the normal operation of the computer, instruction words are read out from the Main Memory to the Instruction Register where the operation code and other execution modifiers are examined. If the instruction calls for a modification of the operand portion of the instruction word, this modification is performed and the modified operand may be transmitted to the Storage Address Register 80. Each stage of this 15-bit register is connected by means of a line in the cable 82 to the input terminals of the Address Translator 84. The translator examines the signals on these 15 lines and develops selection signals in accordance with the particular code combination contained in the register 80. These selection signals are applied by way of cables 86 and 88 to the Y-line drivers 92 and the X-line drivers 110, respectively. Depending upon the address being translated, these line drivers are effective to energize a single X-drive line and single Y-drive line threaded through the core memory array 112. As is well known in the art, in coincident current memories, the simultaneous application of two-half currents, i.e., half of the current required for overcoming the coercive force of the core to thereby switch it from one remanent state to another, causes certain cores in the memory to switch so as to induce voltage signals on the sense lines threaded through them. In the preferred embodiment, each register in the Main Memory is adapted to store a 30-bit word of information. There is a sense line for each bit in a word and, therefore, upon the application of drive currents to a selected memory register, signals are induced on the 30 lines contained within the cable 113 associated with this register. These signals are amplified and shaped by the so-called Sense Amplifier 114 and applied by way of cable 116 to Strobe Gates 118. As is common in the digital computer memory art, the signals being read out from the memory are sensed or strobed at the particular time at which the output from the cores is a maximum. This is done to improve the signal to noise ratio of the memory. Provided that an enabling strobe pulse is present on the conductor 120, the Gates 118 will be enabled causing the signals representing the 30-bit word of information to pass through the 30 conductor cable 122 to the Memory Communications Register 124.

Whether or not an enabling signal will be present on conductor 120 so as to permit the passage of the information word from the Main Memory Communications Register is dependent upon the manner in which the control circuit for the strobe pulse generator 126 is operating. As long as no signal is present on the conductor 127, the Strobe Pulse Generator will produce a pulse on the conductor 120 at a time determined by the memory timing circuits (not shown). However, if a signal is present on conductor 127, the Strobe Pulse Generator 126 will be inhibited or disabled and will not generate a gating pulse on the conductor 120.

In the normal operation of the computer, the Preset Memory Mode flip-flop 128 will be in its cleared state. This being so, no signal passes through the AND gate 130 connected to the set terminal thereof and, hence, gate 132 is disabled. Therefore, when the memory timing chain produces a command signal for causing a strobe pulse to be generated on the conductor 140, no inhibiting signal will result on the conductor 127 and the Strobe Pulse Generator will output a signal on conductor 120 to enable the Strobe Gates 118, thereby allowing the transmission of information from the Main Memory to the Memory Communications Register 124.

On the other hand, if the Preset Memory Mode flip-flop 128 is set, and if the Storage Address Register contains an address lying in a range such that signals are applied to the lines in the cable 90 connected to the output of the Address Translator 84, AND gate 130 will be enabled causing a control signal to appear at the junction 131 to partially enable the AND circuit 132. Now, when the Memory Timing Chain outputs a signal on the conductor 140 for initiating the Strobe Pulse Generator, the AND gate 132 will be fully enabled, producing an inhibiting signal on conductor 127. As already mentioned, this signal precludes the Strobe Pulse Generator from generating an enabling pulse for the Strobe Gates 118.

The Preset Memory of this invention preferably comprises a wired plugboard on which connections are manually made for causing instruction words to be represented. As shown in FIG. 2, the plugboard is divided into two sections, 162 and 164, each containing eight 30-bit words. It should be understood, however, that a greater or lesser number of words of a different size may be wired thereon without departing from the scope of this invention. Generally, the instructions wired into the plugboard are effective to cause the computer to perform an input buffer transfer of information from an external or peripheral device connected to one of the input channels. Therefore, the plugboard can be said to contain a program sub-routine.

The manner in which the instructions wired into the plugboard become available to the Instruction Register so that this input buffer of information can take place will now be described. When the Storage Address Register 80 contains an address lying within a predetermined range of values (octile addresses 00000—00017) the Address Translator 84 causes signals to be developed on lines in the cable 86 which pass through the cable branches 94 and 96 to energize the particular one of the eight Driver circuits 98 determined by the contents of the Storage Address Register. This driver will then generate a current pulse on a line in either cable 158 or 160 to cause a particular one of the sixteen 30 bit words contained in the plugboard to be read out. If the selected word is contained in the plugboard section 162, the 30 bit word will appear as signals on the 30 lines contained in cable 166. Similarly, if the selected address is contained on plugboard section 164, the 30 bit word will be read out therefrom via cable 168.

As already mentioned, when the Preset Memory Mode flip-flop 128 is set, and when the address contained in the register 80 is indicative of an address on the plugboard, AND gate 130 outputs a signal which appears at junction 131 and passes along conductor 138 to a first input terminal AND circuit 136. At the time in the memory cycle at which the strobe pulse normally takes place, a signal appears on conductor 140 and passes by way of conductor 142 to fully enable AND circuit 136 causing an enabling signal for the Output Gates 170 to appear on conductor 174. Also, depending upon the output from the Address Translator 84, one of two possible signals will be applied to a line 100 contained within the cable 86 and the cable branch 94. If this signal is of a first value, indicative of a binary "1" signal, for example, the Buffer Gate 102 will be enabled, allowing the selected 30-bit word from plugboard section 162 to appear on cable 171. Because of the inverter 104, the signal appearing on contactor 106 at this time disables the Buffer 108, thereby precluding a data transfer from plugboard section 164. If the signal on conductor 100 were a binary "0," the opposite situation would result. That is, Buffer Gate 102 would be disabled while Buffer Gate 108 is enabled. When the Preset Memory flip-flop is set, as the memory timing chain is outputting a strobe pulse, a signal appears on conductor 174 to enable the Output Gates 170, thereby effecting a transfer of a 30-bit word from one section of the Preset Memory to the Memory Communications Register 124 by way of cable 176. It can be seen, then, that as far as the Memory Communications Register is concerned, it is unaware of the source of the data word supplied thereto because the transfer takes place at exactly the same time for the condition when the Main Memory is involved and when the Preset Memory is involved. Once the information word is stored in the Memory Communications Register, it becomes available to the other operational registers in the computer, therefore, the computer is free to execute instruction words coming from either the Main Memory or the Plugboard Memory.

The Inhibit Generator 125 connected between the Memory Communications Register and the Main Memory controls the writing of information into the memory. If a stage in the Memory Communication Register contains a logical "1" signal, a logical "0" signal is placed in the corresponding bit position in the memory register being altered. Likewise if the Memory Communications Register stage in question stores a "0" signal, the Inhibit Generator 125 causes a logical "1" signal to be written into the memory in the corresponding bit position.

Whether or not the Preset Mode flip-flop 128 will be set is determined by the manual positioning of the control switch 144. When the switch is in the position illustrated in FIG. 2, the wired memory is completely disabled and all data transfers are from and to the coincident current core memory. In other words, the Preset Memory cannot be referenced.

When the switch 144 is placed on its rightmost o START position, a signal is applied to the conductor 146. It passes through OR circuit 148 to set the flip-flop 128, thereby forcing the computer to take its next information word from the wired plugboard. This feature is employed generally during the initial loading of a program into the Main Memory section of the computer. Typically, the main computer program may be prepared by properly punching a paper tape with a predetermined code pattern. A paper tape reader is then employed to convert the code represented by the punch marks into electrical signals capable of being accepted by the computer. This paper tape reader is connected to one of the plurality of input channels in the Input-Output section of the computer. The routine or sequence of instructions pre-wired on the plugboard can then effect a buffer transfer of the signals from the paper tape reader into the Main Memory section of the computer in the manner fully described in the aforementioned Burkholder et al. application. The last instruction contained in the wired memory can be a jump instruction, so that when all of the instructions in the wired memory have been executed and the main program loaded into the core memory, the computer can automatically jump to the first instruction of the program sequence now contained in the core memory.

When the switch 144 is placed in its leftmost or Automatic Recovery position, a signal is applied by way of conductor 150 to partially enable AND circuit 152. Now, when the computer recognizes an illegal function code, an error signal is developed and applied by way of conductor 154 to fully enable AND circuit 152 causing a signal to pass by way of conductor 156 and OR circuit 148 to place the mode flip-flop 128 in its arbitrarily defined "1" state. As has already been fully described, this causes the computer to take its instructions from the Preset Memory. In this error recovery mode, the routine contained in the Preset Memory may be used to reload the main program into the core memory of the computer. Whenever one of the two illegal function codes enters the Instruction Register 14 (FIG. 1) the translator 34 sends a signal to disable the Program Address Counter (P-Registers) 24 and to clear the Storage Address Register 22. With the S-register cleared, the contents of the Preset Memory at address 00000 (octile) is read out to initiate the "bootstrap routine."

Referring now to FIG. 3, there is shown the general arrangement of the plugboard and its associated circuits. The plugboard employed with the computer described herein has a capacity of sixteen 30-bit words. The apparatus shown in FIG. 3 is only one section of the wired memory and contains only eight of the sixteen words. It should be understood that the apparatus illustrated in FIG. 3 represents only one possible arrangement for the plugboard and that various other mechanical configurations may be employed for achieving the desired result without departing from the scope of the invention.

Each plugboard section is comprised of two parts, 178 and 180. These parts are practically identical except that the plurality of jumper sockets or jacks in each of the eight "word columns" are tied in common, whereas the jacks on board section 180 are electrically isolated from one another. Each of the columns on part 178 are connected to a separate input line 182 which, intum, is adapted to be connected to a separate one of the eight address drivers 98 (FIG. 2). As such, when the Storage Address Register contains signals representing an address on the plugboard, one of these drivers will be activated causing an electrical signal to be applied to all of the jumper sockets in the column associated with it.

Each of the sockets on board section 180 occupying the same relative bit position in each of the eight words is connected to a logical OR circuit. For example, each of the jacks occupying bit position 29 in the eight words is connected by a separate conductor to separate input terminals of OR circuit 184. Each of the jacks occupying bit position 28 in the eight words is connected by a separate conductor to the input terminals of a separate OR circuit 186. Likewise, a separate OR circuit is provided for each of the 30 possible bits and has its input terminals connected to the jacks occupying corresponding relative bit positions in the eight words. The 30 output terminals coming from the 30 OR circuits (three of which are shown in FIG. 3) connect to the 30 stages of the Memory Communications Register or Z-register by way of the Output Gates 170 in FIG. 2. As has already been fully described, when the computer is operating in the wired memory mode, the Output Gates become enabled at the time that the AND circuit 136 is enabled, thereby permitting the data signals to flow to the Memory Communications Register.

In order to initially load a word of information into the Preset Memory, the programmer selectively plugs jumper wires from a bit position on the plugboard section 178 to the corresponding bit position on plugboard section 180. For example, when it is desired to have a logical "1" signal appear at a particular position at the time that a driver is energized, the operator inserts a jumper between corresponding bit positions on sections 178 and 180. If it is desired to have a logical "0" stored at this particular bit position, the operator does not establish a connection between the corresponding bit positions. To more clearly illustrate the foregoing scheme, FIG. 3 illustrates the manner in which the jumpers are connected to write the code 1001 into bit positions 29, 28, 27, and 26 of word register 1. The jumper 188 connects the jack in bit poistion 29 for word register 1 on plugboard section 178 to the jack occupying bit position 29 of word 1 on plugboard section 180. Similarly, the jumper 190 connects the jack 192 occupying bit position 26 of word 1 on section 178 to jack 194 occupying the corresponding bit position on section 180. The jumpers 196 and 198 which are intended to connect bit positions 28 and 27 of section 178 to the jacks occupying the corresponding positions on section 180 are left unconnected. As a result, when the Address Translator selects the driver for word 1 and electrical signal representing a logical "1" will be conveyed over jumpers 188 and 190 to terminals 189 and 194, respectively. Because conductor 200 connects jack 189 to one of the input terminals OR circuit 184, a "1" signal will be applied to it. Only one of the eight drivers is active at any one time. The other inputs to OR circuit 184 will therefore be logical "0's." As is well known in the art, an OR circuit produces a signal on its output line only when one or more of its inputs is at a first predetermined signal level. If none of its inputs are at this level, no signal results on its output line. Because jumpers 196 and 198 are left unconnected, the output from OR circuits 186 and 202 will be zeros. Since a connection is established between jack 192 and jack 194 by jumper 190, the OR circuit for bit position 26 (not shown) would be yielding a logical "1" signal output. The ultimate result is that the code combination 1001 appears at the outputs from the OR circuits. It can be seen, then, that the operator by properly establishing connections between sections 178 and 180 can cause any desired combination of code signals to appear at the output from the 30 OR circuits.

Thus, there has been described a novel and efficient arrangement for controlling the writing of information into the main memory of a digital computer. It will be apparent to those skilled in the art that the several features of the invention provide numerous advantages independently as well as in combination.

It is to be understood that the above described arrangements are illustrative of the application of the principles of the invention. Numerous other arrangements may be devised by those skilled in the art without departing from the spirit and scope of the invention.

What is claimed is:

1. In a digital computer, the combination comprising: a volatile memory for storing data signals including a program of instruction word signals at addressable storage locations; a non-volatile memory for storing a sequence of instruction signals; address register means adapted to receive address representing signals; translator means connected to said register means for examining said address representing signals and for producing selection signals on its output lines in accordance with said address representing signals; driving means connecting said translator means to said volatile and non-volatile memories and responsive to said selection signals for reading out data from a specified one of said storage locations in said volatile memory when said address representing signals lie within a first range of binary values and from said non-volatile memory when said address representing signals lie within a second range of binary values; and control means including error detecting means for sensing errors in the program of instructions stored in said volatile memory connected to said volatile and non-volatile memories and arranged such that in the event of a detected program fault, said sequence of instruction signals contained in said non-volatile memory are executed by the computer to reload a correct program of instructions into said volatile memory.

2. Apparatus as in claim 1 wherein said non-volatile memory is a plugboard wired to generate a predetermined combination of digital signals upon energization by said driving means.

3. Apparatus as in claim 1 and further including means for allowing the read out of data from only one of said memories at a time upon the generation of said selection signals.

4. In a digital computer, the combination comprising: a coincident-current magnetic-core memory including a plurality of addressable storage locations for storing a program sequence of instruction signals; register means for temporarily holding address representing signals; translator means connected to the output of said register means for producing selection signals on its output lines determined by said address representing signals; memory driving circuits connected to said output lines for supplying currents in time-coincidence to the magnetic cores of the storage location determined by said address representing signals; a communications register; first gating means for enabling the transmission of the information from said determined location to the communication register upon the application of said currents to the memory, said communication register being adapted to transfer its contents to at least the first mentioned register means; plugboard means having manually alterable connectors for establishing a sequence of computer instruction signals independent of the first mentioned sequence of instruction signals; plugboard sensing means connected to said plugboard means; means connecting said plugboard sensing means to said translator such that instructions are transferred from said plugboard means to the communication register whenever said address representing signals lie within a first range of values; second gating means connected between said plugboard means and said communication register; and control means including a fault indicator connected to said first and second gating means and operative upon the indication of a fault as a result of execution of the program stored in said core memory to disable said first gating means and to enable said second gating means whereby the computer is forced to obtain its sequence of instruction signals from said plugboard means.

5. Apparatus as in claim 4 and further including manually operable switch means connected to said control means for forcing the computer to accept instructions from said plugboard means even when no program fault has been detected.

6. Apparatus as in claim 4 wherein the sequence of instruction signals represented by the plugboard connections are effective to cause the computer to write a predetermined sequence of instructions in the core memory.

7. Apparatus as in claim 4 wherein the predetermined sequence is a duplicate of at least one sequence of instructions in the core memory before said fault was indicated.

8. In a digital computer, the combination comprising: a main memory for storing data including a program of instruction words at addressable storage locations; and a non-volatile auxiliary memory for storing a preset routine of instructions; address register means for at least temporarily holding address representing signals; translator means connected to said register means for examining said address representing signals and for producing selection signals on its output lines in accordance with said address representing signals; means connected to said translator and to said main and auxiliary memories and responsive to said selection signals for reading out data from a specified one of said storage locations in said main memory when said address representing signals lie within a first range of binary values and from said non-volatile auxiliary memory when said address representing signals lie within a second range of binary values; and control means connected to said non-volatile auxiliary memory; arranged such that when rendered operative, said routine of instructions contained in said non-volatile auxiliary memory are executed by the computer to load a program of instructions into said main memory from an external source of data.

9. Apparatus as in claim 8 wherein said control means includes manually operable switch means for forcing the computer to execute the instructions in said auxiliary memory.

10. In a digital computer, the combination comprising: data input means; a volatile memory for storing data signals including representations of a program of computer instruction words at addressable storage locations connected to receive data words from said data input means; a non-volatile memory for storing a present routine of instructions for effecting a transfer of data words from said data input means to said volatile memory; address register means for temporarily holding memory address representing signals; translator means connected to said register means for producing selection signals on its output lines in accordance with said address representing signals; means connected to the output of said translator means and to said volatile memory and said non-volatile memory and responsive to said selection signals for reading out data signals from a specified one of said storage locations in said volatile memory when said address representing signals lie within a first range of binary values and from said non-volatile memory when said address representing signals lie within a second range of binary values; error signal producing means; and control means connected to receive error signals from said error signal producing means and connected to said non-volatile memory for addressing said routine of instructions contained in said non-volatile memory upon receipt of an error signal to thereby control the transfer of data words from said data input means to said volatile memory.

(References on following page)

References Cited by the Examiner

UNITED STATES PATENTS

| | | | |
|---|---|---|---|
| 3,017,092 | 1/1962 | Rent | 235—157 |
| 3,039,690 | 6/1962 | Yandell | 340—172.5 |
| 3,077,579 | 2/1963 | Greene et al. | 340—172.5 |

OTHER REFERENCES

Pages 320 to 327, 1955—"Arithmetic Computations, in Digital Computers" (Richards) Published by Nostrand.

ROBERT C. BAILEY, *Primary Examiner.*

MALCOLM A. MORRISON, *Examiner.*